(12) United States Patent
Archer et al.

(10) Patent No.: US 8,544,026 B2
(45) Date of Patent: Sep. 24, 2013

(54) PROCESSING DATA COMMUNICATIONS MESSAGES WITH INPUT/OUTPUT CONTROL BLOCKS

(75) Inventors: Charles J. Archer, Rochester, MN (US); Gary R. Ricard, Chatfield, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 12/702,661

(22) Filed: Feb. 9, 2010

(65) Prior Publication Data

US 2011/0197204 A1 Aug. 11, 2011

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .......................................................... 719/315

(58) Field of Classification Search
USPC .......................................................... 719/315
See application file for complete search history.

(56) References Cited

U.S. PATENT DOCUMENTS

| | | | |
|---|---|---|---|
| 4,933,846 A | 6/1990 | Humphrey et al. | |
| 5,050,162 A | 9/1991 | Golestani | |
| 5,083,265 A * | 1/1992 | Valiant | 712/21 |
| 5,136,582 A | 8/1992 | Firoozmand | |
| 5,437,042 A | 7/1995 | Culley et al. | |
| 5,448,698 A | 9/1995 | Wilkes | |
| 5,617,537 A | 4/1997 | Yamada et al. | |
| 5,680,116 A | 10/1997 | Hashimoto et al. | |
| 5,689,509 A | 11/1997 | Gaytan et al. | |
| 5,721,921 A * | 2/1998 | Kessler et al. | 718/102 |
| 5,758,075 A | 5/1998 | Graziano et al. | |
| 5,781,775 A * | 7/1998 | Ueno | 718/102 |
| 5,790,530 A | 8/1998 | Moh et al. | |
| 5,796,735 A | 8/1998 | Miller et al. | |
| 5,802,366 A | 9/1998 | Row et al. | |
| 5,928,351 A * | 7/1999 | Horie et al. | 712/11 |
| 5,961,659 A | 10/1999 | Benner | |
| 6,085,303 A * | 7/2000 | Thorson et al. | 712/16 |
| 6,105,122 A | 8/2000 | Muller et al. | |
| 6,161,198 A | 12/2000 | Hill et al. | |

(Continued)

OTHER PUBLICATIONS

Final Office Action, U.S. Appl. No. 11/740,361, Sep. 29, 2011.

(Continued)

*Primary Examiner* — Andy Ho
*Assistant Examiner* — Timothy A Mudrick
(74) *Attorney, Agent, or Firm* — Biggers & Ohanian, LLP

(57) ABSTRACT

Processing data communications messages with an Input/Output Control Block ('IOCB') ring that includes a number of IOCBs characterized by a priority and arranged in sequential priority for serial operation, where processing the messages includes depositing message data in one or more IOCBs according to depositing criteria; processing, by a message processing module associated with an IOCB having a priority less than the present value of a state counter, the message data in the IOCB while a message processing module associated with an IOCB having a next priority waits; increasing, upon completion of processing the message data of the IOCB having a priority less than the present value of the state counter, the present value of the state counter to a value greater than the next priority; and processing, by the message processing module associated with the IOCB having the next priority, the message data in the IOCB.

14 Claims, 11 Drawing Sheets

(56) References Cited

U.S. PATENT DOCUMENTS

| | | | |
|---|---|---|---|
| 6,356,951 | B1 | 3/2002 | Gentry, Jr. |
| 6,711,632 | B1 | 3/2004 | Chow et al. |
| 6,735,662 | B1 | 5/2004 | Connor |
| 6,744,765 | B1 | 6/2004 | Dearth et al. |
| 6,754,732 | B1 | 6/2004 | Dixon et al. |
| 6,857,030 | B2 | 2/2005 | Webber |
| 6,977,894 | B1 | 12/2005 | Achilles et al. |
| 6,981,074 | B2 | 12/2005 | Oner et al. |
| 7,031,305 | B1 | 4/2006 | Yu et al. |
| 7,111,092 | B1 | 9/2006 | Mitten et al. |
| 7,155,541 | B2 | 12/2006 | Ganapathy et al. |
| 7,805,546 | B2 * | 9/2010 | Archer et al. ............... 710/22 |
| 7,827,024 | B2 * | 11/2010 | Archer et al. ............... 703/24 |
| 7,836,143 | B2 * | 11/2010 | Blocksome et al. ......... 709/212 |
| 7,890,670 | B2 | 2/2011 | Archer et al. |
| 7,921,428 | B2 * | 4/2011 | Archer et al. ............... 719/313 |
| 7,966,618 | B2 * | 6/2011 | Archer et al. ............... 719/313 |
| 8,018,951 | B2 * | 9/2011 | Blocksome ............... 370/395.7 |
| 8,037,213 | B2 * | 10/2011 | Archer et al. ............... 710/22 |
| 2004/0057380 | A1 | 3/2004 | Biran et al. |
| 2004/0078405 | A1 | 4/2004 | Bhanot et al. |
| 2004/0218631 | A1 | 11/2004 | Ganfield |
| 2005/0078669 | A1 | 4/2005 | Oner |
| 2005/0213570 | A1 | 9/2005 | Stacy et al. |
| 2006/0161733 | A1 * | 7/2006 | Beckett et al. ............... 711/118 |
| 2006/0190640 | A1 | 8/2006 | Yoda et al. |
| 2006/0206635 | A1 | 9/2006 | Alexander et al. |
| 2006/0218429 | A1 | 9/2006 | Sherwin et al. |
| 2006/0230119 | A1 | 10/2006 | Hausauer et al. |
| 2006/0253619 | A1 | 11/2006 | Torudbakken et al. |
| 2007/0165672 | A1 | 7/2007 | Keels et al. |
| 2008/0101295 | A1 | 5/2008 | Tomita et al. |
| 2008/0222317 | A1 | 9/2008 | Go et al. |
| 2008/0267066 | A1 * | 10/2008 | Archer et al. ............... 370/235 |
| 2008/0273543 | A1 | 11/2008 | Blocksome et al. |
| 2009/0006808 | A1 * | 1/2009 | Blumrich et al. ............ 712/12 |
| 2009/0019190 | A1 * | 1/2009 | Blocksome ................. 710/25 |
| 2009/0031001 | A1 * | 1/2009 | Archer et al. ............... 709/212 |
| 2009/0031002 | A1 * | 1/2009 | Blocksome ................. 709/212 |
| 2010/0082848 | A1 | 4/2010 | Blocksome et al. |

OTHER PUBLICATIONS

Office Action, U.S. Appl. No. 11/776,718, Oct. 19, 2011.
Watson, Robert, "DMA Controller Programming in C," C Users Journal, v11n11, Nov. 1993, p. 35-50.
Office Action Dated May 26, 2009 in U.S. Appl. No. 11/829,325.
Office Action Dated Aug. 27, 2009 in U.S. Appl. No. 11/739,948.
Office Action Dated Sep. 1, 2009 in U.S. Appl. No. 11/776,718.
Kumar et al., A Network on Chip Architecture and Design Methodology, IEEE Computer Society Annual Symposium on VLSI, 2002.
Final Office Action, U.S. Appl. No. 11/776,707, Jan. 6, 2011.
Final Office Action, U.S. Appl. No. 11/740,361, Oct. 4, 2010.
Office Action, U.S. Appl. No. 11/755,501, Nov. 26, 2010.
Moreira, et al.; The Blue Gene/L Supercomputer: A Hardware and Software Story; International Journal of Parallel Programming; Jun. 2007; pp. 181-206; vol. 35, No. 3, Springer Science+Business Media LLC.; USA.
Notice of Allowance, U.S. Appl. No. 11/754,719, Apr. 6, 2010.
Office Action, U.S. Appl. No. 11/744,319, May 12, 2010.
Office Action, U.S. Appl. No. 11/829,317, May 26, 2010.
Final Office Action, U.S. Appl. No. 11/746,348, Feb. 23, 2010.
Notice of Allowance, U.S. Appl. No. 11/758,167, Mar. 12, 2010.
Office Action, U.S. Appl. No. 11/754,719, Oct. 14, 2008.
Office Action, U.S. Appl. No. 11/754,719, Mar. 4, 2009.
Office Action, U.S. Appl. No. 11/758,167, Nov. 21, 2008.
Office Action, U.S. Appl. No. 11/744,296, Aug. 20, 2009.
Office Action, U.S. Appl. No. 11/746,348, Sep. 2, 2009.
Final Office Action, U.S. Appl. No. 11/758,167, Apr. 24, 2009.
Final Office Action, U.S. Appl. No. 11/754,719, Aug. 5, 2009.
Final Office Action, U.S. Appl. No. 11/744,296, Feb. 24, 2010.
Notice of Allowance, U.S. Appl. No. 11/746,348, Oct. 5, 2010.
RCE, U.S. Appl. No. 11/740,361, Jan. 30, 2012.
Notice of Allowance, U.S. Appl. No. 11/755,501, Jun. 9, 2011.
Final Office Action, U.S. Appl. No. 11/776,718, Mar. 30, 2012.
Ron Brightwell, Keith D. Underwood, "An Analysis of NIC Resource Usage for Offloading MPI," ipdps, vol. 9, pp. 183a, 18th International Parallel and Distributed Processing Symposium (IPDPS'04)—Workshop 8, 2004.
Keith D. Underwood, Ron Brightwell, "The Impact of MPI Queue Usage on Message Latency," icpp, pp. 152-160, 2004 International Conference on Parallel Processing (ICPP'04), 2004.
Keith D. Underwood, K. Scott Hemmert, Arun Rodrigues, Richard Murphy, Ron Brightwell, "A Hardware Acceleration Unit for MPI Queue Processing," ipdps, vol. 1, pp. 96b, 19th IEEE International Parallel and Distributed Processing Symposium (IPDPS'05)—Papers, 2005.
Office Action, U.S. Appl. No. 12/702,661, Dec. 14, 2012.
Office Action, U.S. Appl. No. 12/956,903, Mar. 19, 2013.

* cited by examiner

PROCESSING DATA COMMUNICATIONS MESSAGES WITH INPUT/OUTPUT CONTROL BLOCKS

BACKGROUND OF THE INVENTION

1. Field of the Invention

The field of the invention is data processing, or, more specifically, methods, apparatus, and products for processing data communications messages with IOCBs.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are connected into a binary tree: each node has a parent, and two children (although some nodes may only have zero children or one child, depending on the hardware configuration). Although a tree network typically is inefficient in point to point communication, a tree network does provide high bandwidth and low latency for certain collective operations, message passing operations where all compute nodes participate simultaneously, such as, for example, an allgather operation. In computers that use a torus and a tree network, the two networks typically are implemented independently of one another, with separate routing circuits, separate physical links, and separate message buffers.

As described above, data communications in a parallel computer may be carried out in a parallel fashion. In some instances, however, some data communications operations must be carried out serially with respect to other data communications operations. That is, one operation is dependent upon the output of another operation. What is needed, therefore, is a technique for serially processing data communications messages in a parallel computer.

SUMMARY OF THE INVENTION

Methods, apparatus, and products for processing data communications messages in a parallel computer with a plurality of Input/Output Control Blocks ('IOCBs'). Each IOCB is characterized by a priority. The IOCBs are arranged in sequential priority for serial operations. Processing data communications messages in accordance with embodiments of the present invention includes depositing message data in one or more IOCBs according to depositing criteria for each IOCB; processing, by a message processing module associated with an IOCB having a priority less than the present value of a state counter, the message data in the IOCB while a message processing module associated with an IOCB having a next priority waits; increasing, upon completion of processing the message data of the IOCB having a priority less than the present value of the state counter, the present value of the state counter to a value greater than the next priority; and processing, by the message processing module associated with the IOCB having the next priority, the message data in the IOCB having the next priority.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
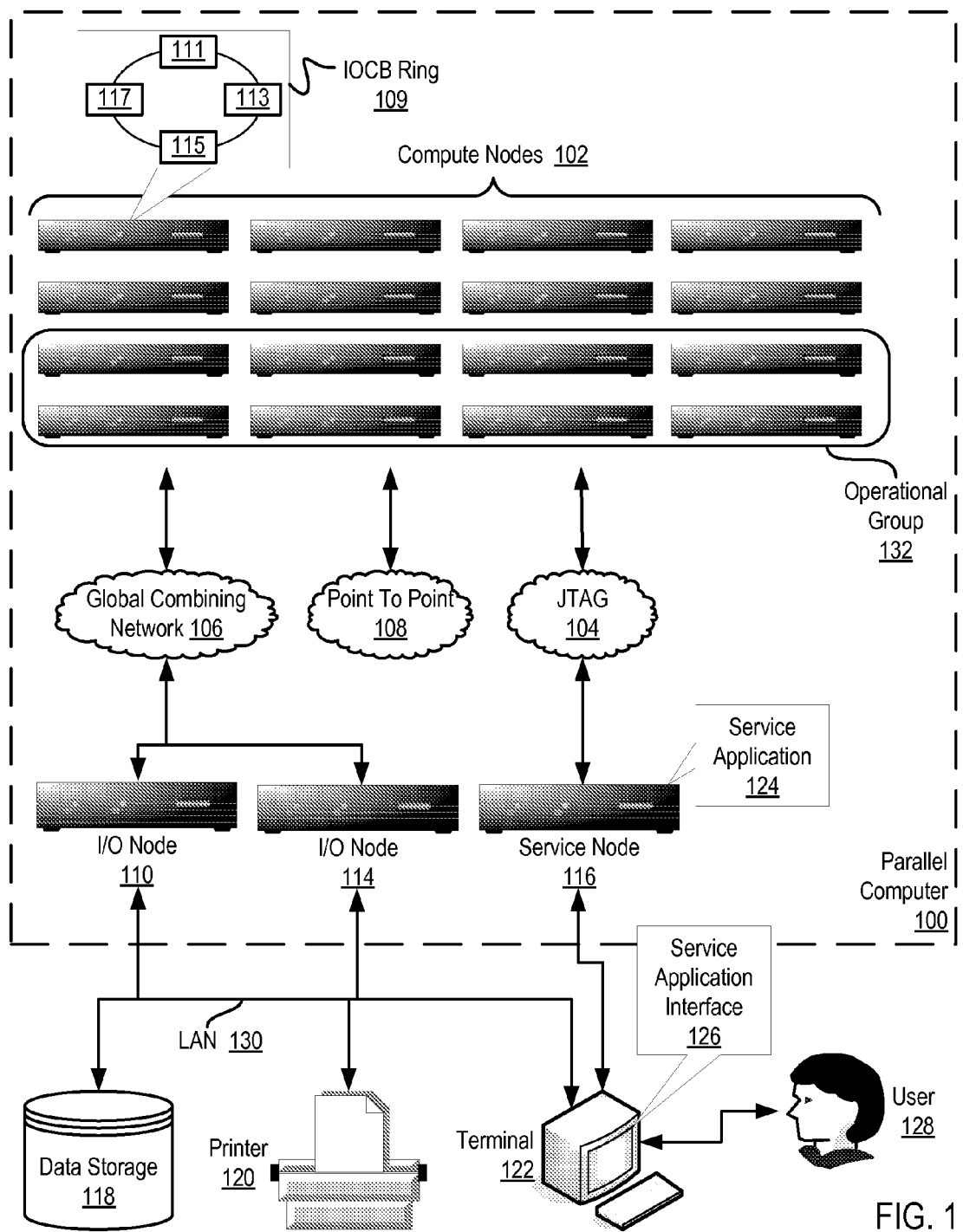
FIG. 1 illustrates an exemplary system for processing data communications messages with IOCBs according to embodiments of the present invention.

Exemplary methods, apparatus, and products for processing data communications messages with IOCBs in accordance with embodiments of the present invention are described with reference to the accompanying drawings, beginning with FIG. 1. FIG. 1 illustrates an exemplary system for processing data communications messages with IOCBs according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following predefined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally for processing data communications messages with IOCBs according to embodiments of the present invention. In the system of FIG. 1, one compute node (102) includes an Input/Output Control Block ('IOCB') ring (109) that in turn includes a number of IOCBs (111, 113, 115, 117). An IOCB ring is an example arrangement of IOCBs for clarity of explanation. IOCBs useful in parallel computers that process message data in accordance with embodiments of the present invention may be arranged as a variety of structures including, for example, an array, a linked list, an array of pointers, and so on as will occur to readers of skill in the art. In the example of FIG. 1, each IOCB is characterized by a priority. The IOCBs are arranged in sequential priority for serial operations.

Processing data communications messages with an IOCB ring in the system of FIG. 1 includes depositing message data in one or more of the IOCBs (111, 113, 115, 117) in the IOCB ring (109) according to depositing criteria for each IOCB. Processing data communications messages may also include processing, by a message processing module associated with an IOCB (111, 113, 115, 117) having a priority less than the present value of a state counter, the message data in the IOCB while a message processing module associated with an IOCB having a next priority waits. In some embodiments, the data in all IOCBs (111, 113, 115, 117) is processed in parallel until processing encounters a dependency on the processing of an IOCB of lesser priority. The processing that encounters the dependency is halted until being freed by a change in the value of the state counter.

Processing data communications messages by the example compute node (102) of FIG. 1 may also include increasing, upon completion of processing the message data of the IOCB (111, 113, 115, 117) having a priority less than the present value of the state counter, the present value of the state counter to a value greater than the next priority. The message processing module associated with the IOCB having the next priority, may then process the message data in the IOCB having the next priority. In this way, message processing modules associated with IOCBs having a priority less than present value of the state counter process the data in the associated IOCB, while data in other IOCBs may remain unprocessed. It said that data in other IOCBs may remain unprocessed because in some embodiments, processing of IOCBs, regardless of priority may be carried out in parallel prior to processing of one or more of the IOCBs encountering a dependency. In these embodiments, only upon encountering such a dependency will processing of an IOCB halt. Consider as an example of the first mentioned embodiment, that IOCBs (111 and 113) have a priority of one, while IOCBs (115 and 117) have a priority of two. When the state counter is set to two, message processing modules for IOCBs (111 and 113) operate, while message processing modules for IOCBs (115 and 117) wait. When the state counter is set to three, message processing modules for IOCBs (115 and 117) may begin processing data stored in IOCBs (115 and 117). Assuming the same priorities, in the second embodiment described above, when the state counter is set to two, message processing modules for all IOCBs (111, 113, 115, and 117) may operate in parallel until the message processing modules for IOCBs (115 and 117) encounter a dependency. Upon encountering such a dependency the message processing modules for the IOCBs (115 and 117) halt operation until the state counter is set to three.

The arrangement of nodes, networks, and I/O devices making up the exemplary system illustrated in FIG. 1 are for explanation only, not for limitation of the present invention. Data processing systems capable of processing data communications messages with IOCBs according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of processing data communications messages with IOCBs according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Processing data communications messages with IOCBs according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of processing data communications messages with IOCBs according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Figure 2:
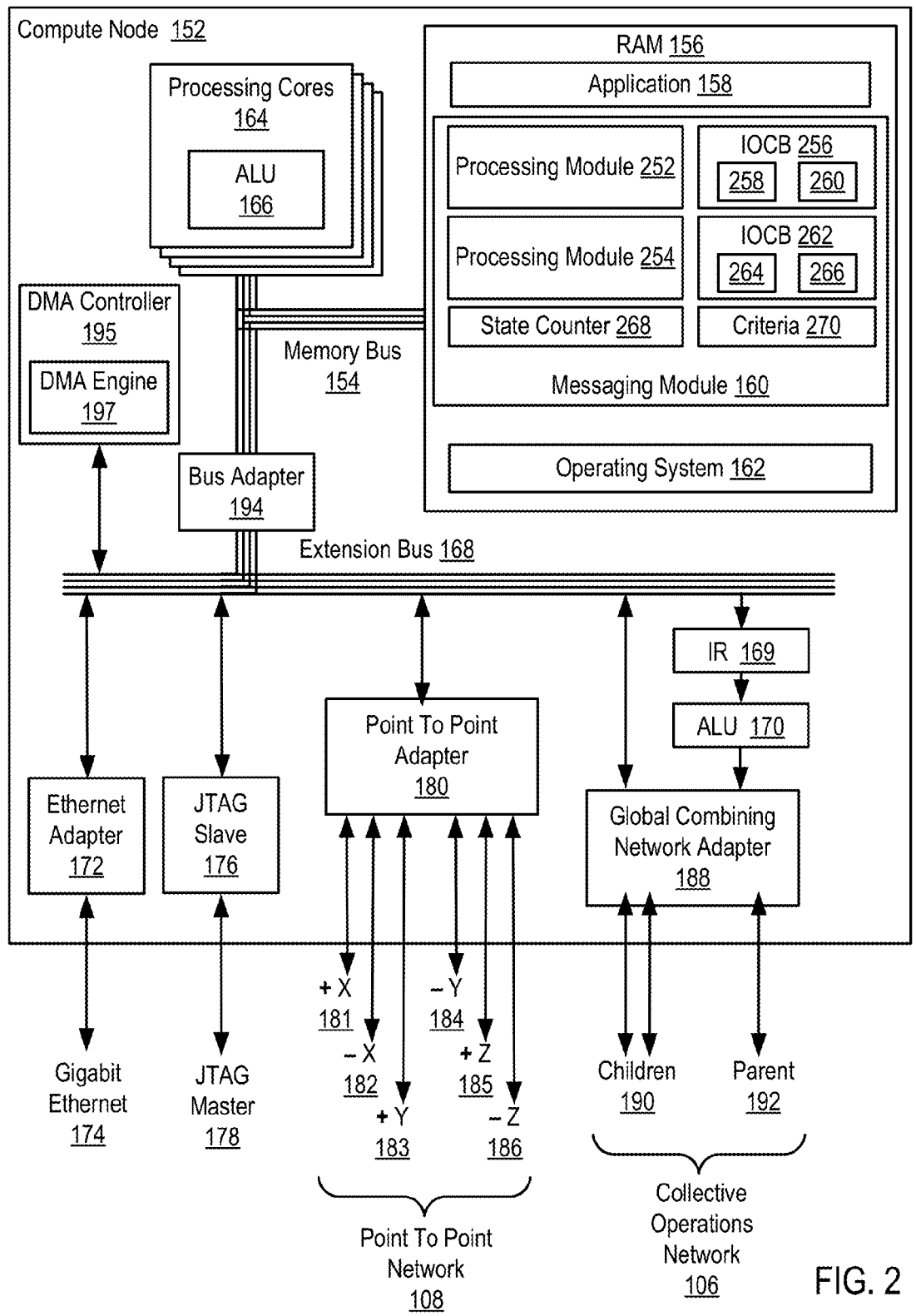
FIG. 2 sets forth a block diagram of an exemplary compute node useful in a parallel computer capable of processing data communications messages with IOCBs according to embodiments of the present invention.

The messaging module (160) of FIG. 2 has been adapted for processing data communications messages with IOCBs according to embodiments of the present invention. The example messaging module (160) of FIG. 2 includes an Input/Output Control Block ('IOCB') ring, one example arrangement among many possible arrangements of IOCBs useful for processing message data in accordance with embodiments of the present invention. The example IOCB ring of FIG. 2 includes two IOCBs (256, 262). An IOCB is a data structure configured to store data to be processed. An IOCB (256, 262) may be generated by an application (158), by a messaging module (160), or other module of automated computing machinery, for use in processing data communications messages in accordance with embodiments of the present application. An IOCB (256, 262) may be generated by establishing, as an IOCB, a data structure including assigning the IOCB (256, 264) a priority (258,264) and configuring the IOCB (256, 264) to receive message data according to depositing criteria (270). The IOCBs (256, 262) in the example of FIG. 2 may be established in a parallel computer, a non-parallel computer, or in other computing environments as will occur to readers of skill in the art.

Data may be stored in an IOCB in various ways including, for example, by storing pointers to memory address locations storing the data, by storing the actual data to be processed in the data structure, and in other ways as will occur to readers of skill in the art. In some embodiments, an IOCB is implemented as a list of memory addresses, with one or more of the memory addresses identifying a storage location of data to be processed. An IOCB ring is a set of ordered IOCBs in which each of the IOCBs includes, as a final address in the data structure, a pointer to the next IOCB in the ring, and the final IOCB in the ring includes a pointer to the first IOCB in the ring.

As mentioned above, each IOCB (256, 262) in the example of FIG. 2 is characterized by a priority (258, 264). The IOCBs (256, 262) are arranged in sequential priority for serial operations. Consider for purposes of explanation, not limitation, that IOCB (256) has a priority (258) equal to one, while IOCB (262) has a priority (264) equal to two.

The messaging module (160) may process data communications messages with the IOCBs in the system of FIG. 2 in accordance with embodiments of the present invention by depositing message data (260, 266) in one or more of the IOCBs (256, 262) according to depositing criteria for each IOCB. Depositing criteria are rules that govern the storage of data in an IOCB. Such rules, may for example, specify that a particular size of data be stored in the IOCB, a particular number of data elements be stored in the IOCB, and so on as will occur to readers of skill in the art.

The messaging module (160) may also process data communications message by processing, by a message processing module (252) associated with an IOCB (256) having a priority (258) less than the present value of a state counter (268), the message data (260) in the IOCB while a message processing module (254) associated with an IOCB (262) having a next priority (264) waits. A message processing module (252, 254) is a module of automated computing machinery configured to process data in an IOCB. IOCBs may be recycled after being processed. As such, a message processing module may be associated at various times with various IOCBs. Each message processing module (252, 254) may be configured to perform various types of data processing. The message processing module (252, 254) may be configured to carry out the data processing in a parallel manner, processing multiple entries of the IOCB at the same time, or serially, one entry at a time.

A state counter operates as a type of semaphore, locking message processing modules from operating. In some embodiments, the state counter locks message processing modules from operating only after the message processing module encounters a data dependency. A message processing module, for example, after encountering a data dependency, may process data in an associated IOCB when the value of the state counter (268) is greater than the priority of the associated IOCB. In this way, data processing may be carried out serially, beginning with an IOCB of lower priority and continuing with an IOCB of higher priority only when the value of the state counter is increased.

Upon completion of processing the message data (258) of the IOCB (256) having a priority (258) less than the present value of the state counter (268), the message processing module (252) increases the present value of the state counter (268) to a value greater than the next priority (264). Upon the change in value of the state counter to a value greater than the next priority (264), the message processing module (254) associated with the IOCB (262) having the next priority (264) may process the message data (266) in that IOCB (262).

By enabling the parallel processing of message data in IOCBs of differing priority, a sequential task may be executed with an optimal amount of parallel processing. Not only may the processing of each IOCB individually be carried out with parallel processing, but the processing of multiple IOCBs may also be carried out, prior to encountering dependencies, with parallel processing. In this way, a significant portion of data in IOCBs may be processed in parallel, prior to dependencies being encountered, and only the final dependent portions of processing need be carried out sequentially.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems that process data communications messages with IOCBs according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in processing data communications messages with IOCBs according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. The DMA engine (197) of FIG. 2 is typically stored in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

Figure 3A:
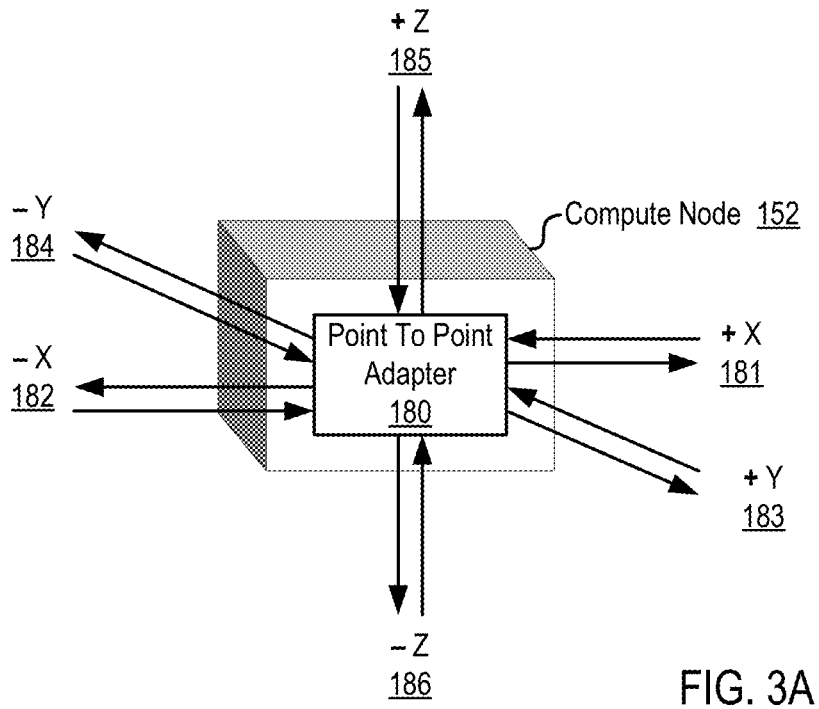
FIG. 3A illustrates an exemplary Point To Point Adapter useful in systems capable of processing data communications messages with IOCBs according to embodiments of the present invention.

For further explanation, FIG. 3A illustrates an exemplary Point To Point Adapter (180) useful in systems capable of processing data communications messages with IOCBs according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
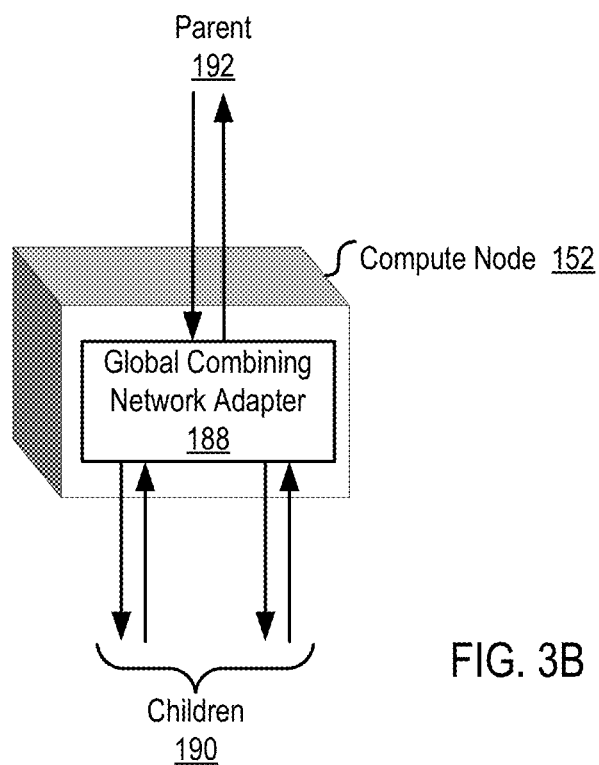
FIG. 3B illustrates an exemplary Global Combining Network Adapter useful in systems capable of processing data communications messages with IOCBs according to embodiments of the present invention.

For further explanation, FIG. 3B illustrates an exemplary Global Combining Network Adapter (188) useful in systems capable of processing data communications messages with IOCBs according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
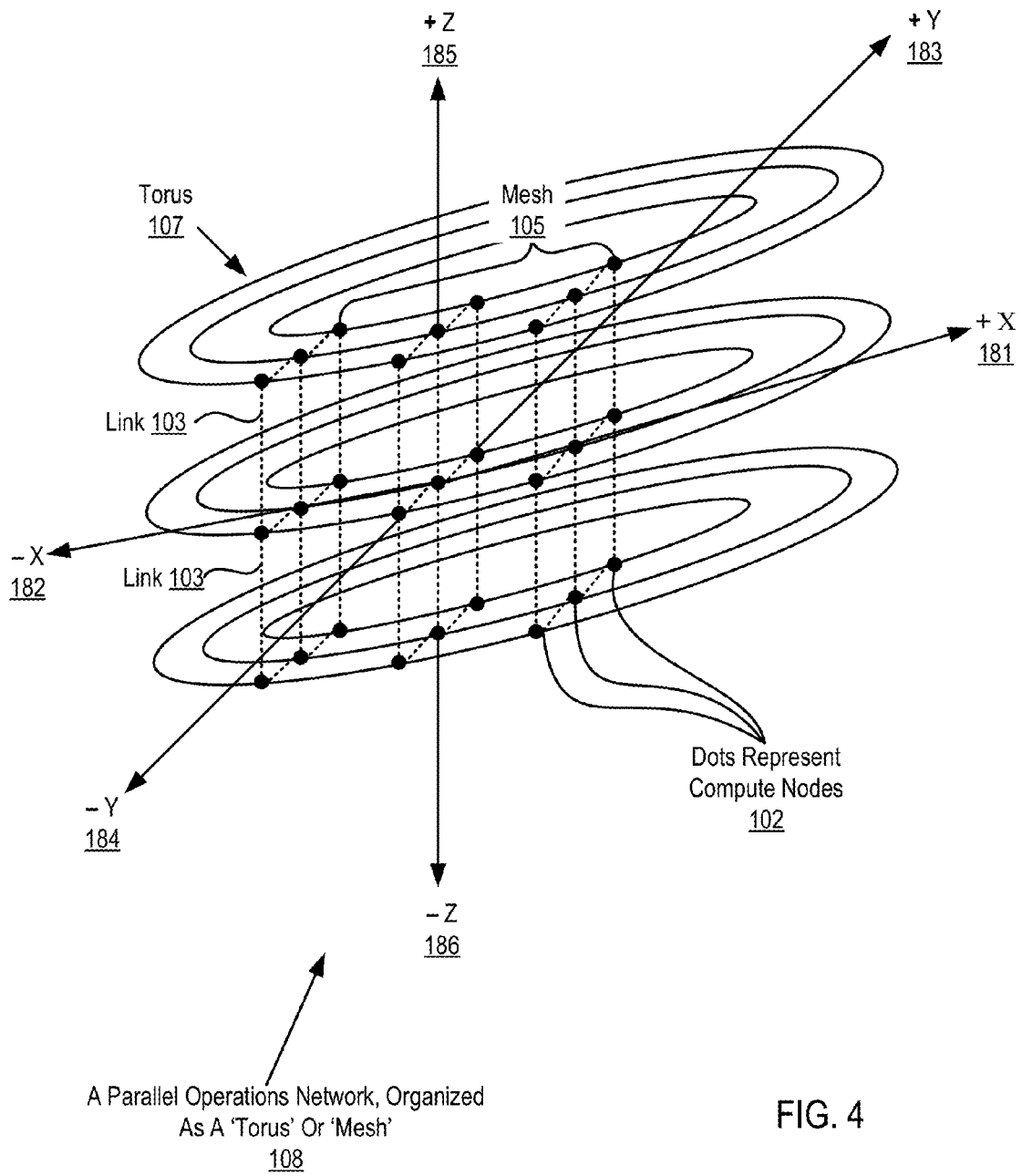
FIG. 4 sets forth a line drawing illustrating an exemplary data communications network optimized for point to point operations useful in systems capable of processing data communications messages with IOCBs in accordance with embodiments of the present invention.

For further explanation, FIG. 4 sets forth a line drawing illustrating an exemplary data communications network (108) optimized for point to point operations useful in systems capable of processing data communications messages with IOCBs in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in processing data communications messages with IOCBs in accordance with embodiments of the present invention may contain only a few compute nodes or may contain thousands of compute nodes.

Figure 5:
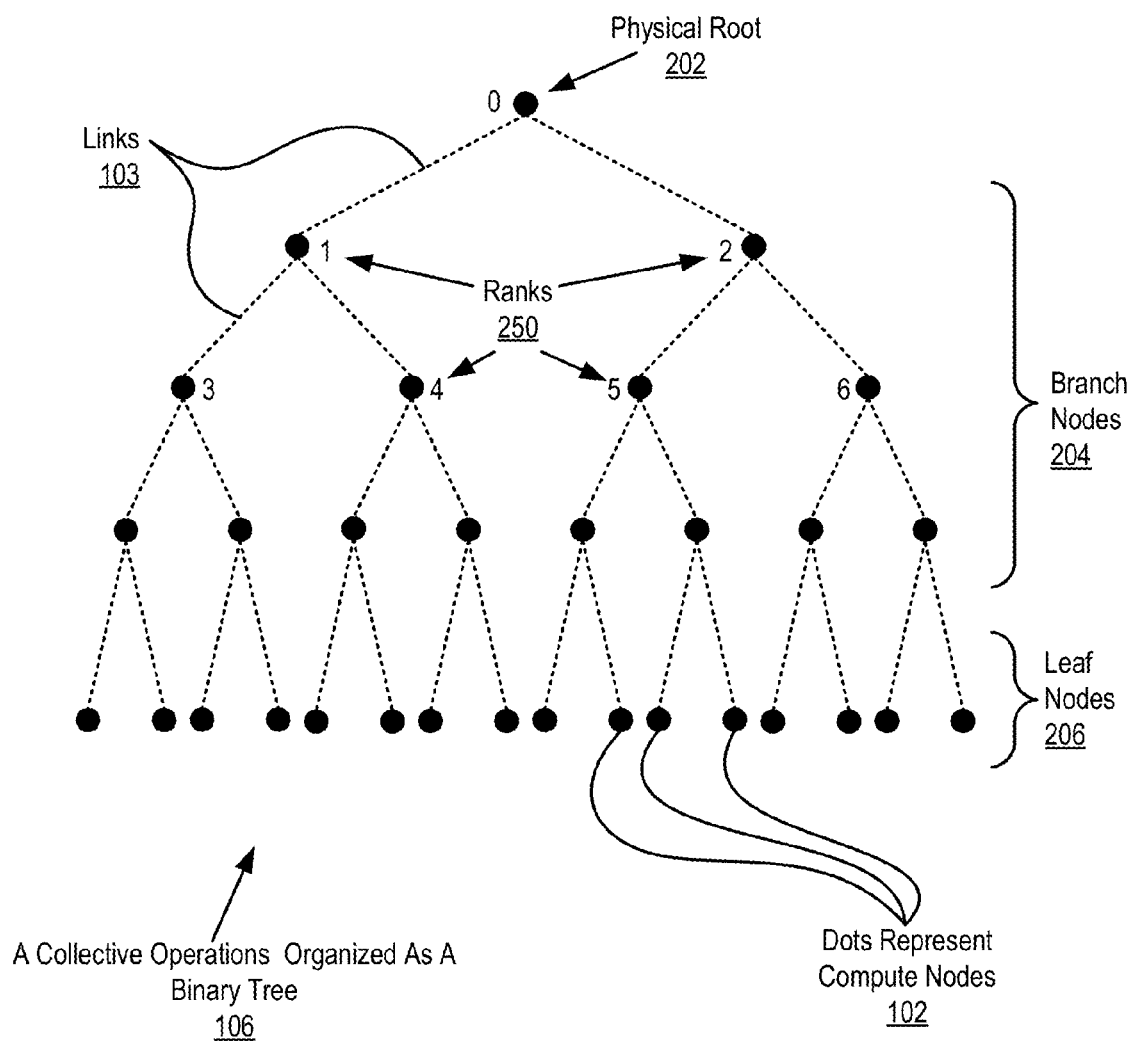
FIG. 5 sets forth a line drawing illustrating an exemplary data communications network optimized for collective operations useful in systems capable of processing data communications messages with IOCBs in accordance with embodiments of the present invention.

For further explanation, FIG. 5 sets forth a line drawing illustrating an exemplary data communications network (106) optimized for collective operations useful in systems capable of processing data communications messages with IOCBs in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for processing data communications messages with IOCBs in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
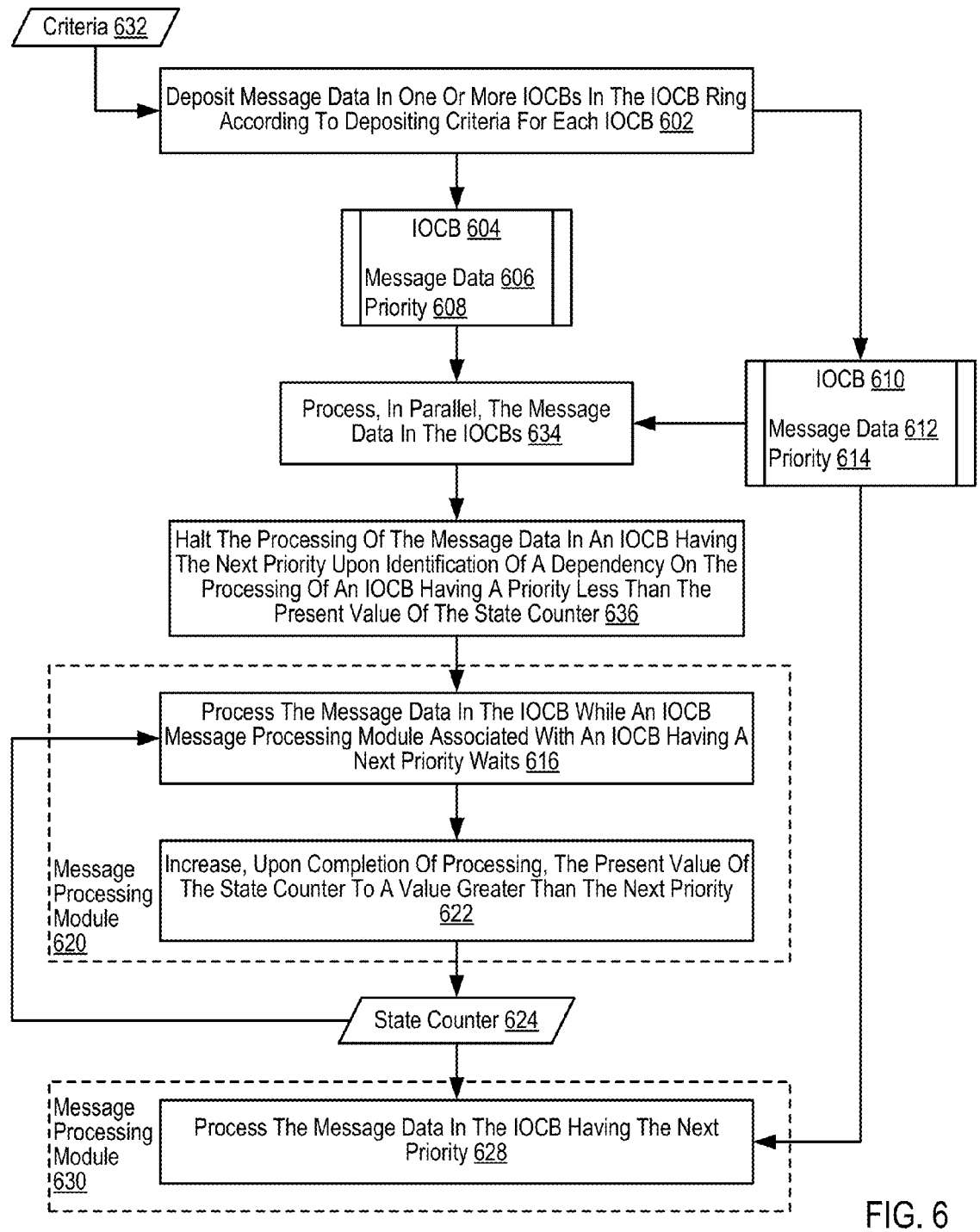
FIG. 6 sets forth a flow chart illustrating an exemplary method for processing data communications messages with IOCBs according to embodiments of the present invention.

For further explanation, FIG. 6 sets forth a flow chart illustrating an exemplary method for processing data communications messages with IOCBs according to embodiments of the present invention. In the method of FIG. 6, each IOCB (604, 610) is characterized by a priority (608, 614) and the IOCBs are arranged in sequential priority (608, 614) for serial operations.

The method of FIG. 6 includes depositing (602) message data (606, 612) in one or more IOCBs (604, 610) according to depositing criteria (632) for each IOCB (604, 610). Depositing (602) message data (606, 612) in one or more IOCBs (604, 610) may be carried out by storing data in memory space designated for the IOCB or storing pointers to memory locations storing the message data.

The method of FIG. 6 also includes processing (634), in parallel, the message data (606, 612) in the IOCBs (604, 610). Processing (634) the message data (606, 612) in the IOCBs (604, 610) may be carried out by message processing modules (620, 630) associated with the IOCBs (604, 610). Processing (634) of the message data in the IOCBs (604, 610) is carried out with regard to priority. That is, all IOCBs may be processed at the same time, enable parallelism in what would otherwise be a sequential task.

The method of FIG. 6 also includes halting (636) the processing of the message data in an IOCB having the next priority (610) upon identification of a dependency on the processing of an IOCB having a priority less than the present value of the state counter. A message processing module may identify a dependency in many ways including for example, by identifying parameters of function calls specifically designated as parameters dependent upon other processing, by identifying computer program instructions specified as instructions dependent upon other processing, and by identifying data as dependent data from a list of data dependencies maintained by an IOCB administrator or application, such as a message passing module, and so on as will occur to readers of skill in the art.

The method of FIG. 6 also includes processing (616), by a message processing module (620) associated with an IOCB (604) having a priority (608) less than the present value of a state counter (624), the message data (606) in the IOCB (604) while the message processing module (630) associated with the IOCB (610) having a next priority (614) waits. Processing (616) the message data (606) may be carried out serially, entry by entry, or in a parallel manner. In the example of FIG. 6, the message processing module (630) is waiting after halting (636) operation upon identifying a dependency as an example only, not limitation. In some embodiments of the present invention, the method of FIG. 6 does not include the steps of processing (634) the message data in the IOCBs in parallel and halting (636) the processing of message data in the IOCB having the next priority upon identification of the dependency. In such embodiments, an IOCB having a next priority may not execute until the state counter is set to a value greater than the next priority.

The method of FIG. 6 also includes, increasing (622), upon completion of processing (616) the message data of the IOCB (604) having a priority (608) less than the present value of the state counter (624), the present value of the state counter (624) to a value greater than the next priority (614). The message processing module (620) may be configured to set the state counter (624) to a predefined value or increment the state counter.

The method of FIG. 6 also includes, processing (628), by the message processing module (630) associated with the IOCB (610) having the next priority (614), the message data (612) in the IOCB (610) having the next priority (614). That is, upon discovering the value of the state counter (624) is greater than the IOCB's (610) priority (614), the message processing module (630) is released, no longer blocked in a waiting state, and may process the message data (612) in the IOCB (610).

Figure 7:
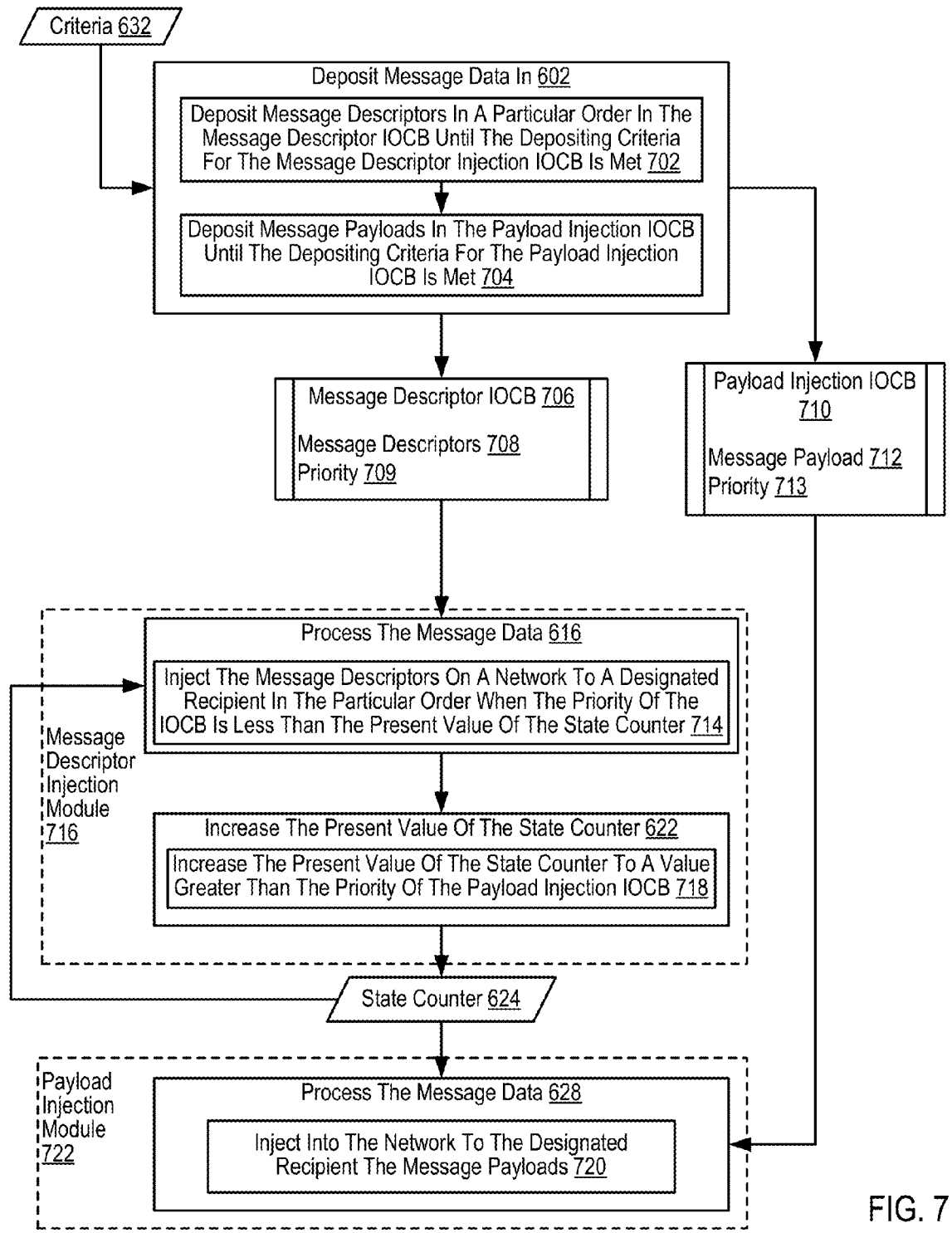
FIG. 7 sets forth a flow chart illustrating a further exemplary method for processing data communications messages with IOCBs according to embodiments of the present invention.

For further explanation, FIG. 7 sets forth a flow chart illustrating an exemplary method for processing data communications messages with IOCBs according to embodiments of the present invention. The method of FIG. 7 is similar to the method of FIG. 6 in that, in the method of FIG. 7, each IOCB is characterized by a priority (709, 713) and the IOCBs are arranged in sequential priority (709, 713) for serial operations. The method of FIG. 7 is also similar to the method of FIG. 6 in that the method of FIG. 7 includes depositing (602) message data (606, 612) in one or more IOCBs according to depositing criteria (632) for each IOCB; processing (616), by a message processing module associated with an IOCB having a priority less than the present value of a state counter (624), the message data in the IOCB while a message processing module associated with an IOCB having a next priority waits; increasing (622), upon completion of processing (616) the message data of the IOCB having a priority less than the present value of the state counter (624), the present value of the state counter (624) to a value greater than the next priority; and processing (628), by the message processing module associated with the IOCB having the next priority, the message data in the IOCB having the next priority.

The method of FIG. 7 differs from the method of FIG. 6, however, in that in the method of FIG. 7, the IOCBs include a message descriptor injection IOCB (706) and a payload injection IOCB (710). The message descriptor injection IOCB (706) has a priority (709) less than the priority (713) of the payload injection IOCB (710)

The method of FIG. 7 also differs from the FIG. 6 in that in the method of FIG. 7, depositing (602) message data (606, 612) in one or more IOCBs according to depositing criteria (632) for each IOCB is carried out by depositing (702) message descriptors (708) in a particular order in the message descriptor IOCB (706) until the depositing criteria (632) for the message descriptor injection IOCB (706) is met and depositing (704) message payloads (712) in the payload injection IOCB (710) until the depositing criteria (632) for the payload injection IOCB (710) is met. A data communications message may consist of a message descriptor and payload data. The message descriptor may be data describing the message, such as the message size, target destination, sender, type of message, and other control information as will occur to readers of skill in the art.

Also in the method of FIG. 7, processing (616), by a message processing module associated with an IOCB having a priority less than the present value of a state counter (624), the message data in the IOCB while a message processing module associated with an IOCB having a next priority waits is carried out by injecting (714), by a message descriptor injection module (716), the message descriptors (708) on a network to a designated recipient in the particular order when the priority (709) of the IOCB (706) is less than the present value of the state counter (624) while a payload injection module (722) associated with the payload injection IOCB (710) waits. In this way message match consistency is maintained—message descriptors are sent to target destinations prior to the payloads of those messages. In some networks, message match consistency is desired or required. Message match consistency requires that message descriptors be sent prior to the actual payload of the message.

In the method of FIG. 7, increasing (622), upon completion of processing (616) the message data of the IOCB having a priority less than the present value of the state counter (624), the present value of the state counter (624) to a value greater than the next priority is carried out by increasing (718) by the message descriptor injection module (716) the present value of the state counter (624) to a value greater than the priority (713) of the payload injection IOCB (710). Processing (628) the message data in the IOCB having the next priority in the method of FIG. 7 is carried out by injecting (720), by the payload injection module (722), into the network to the designated recipient the message payloads (712).

Figure 8:
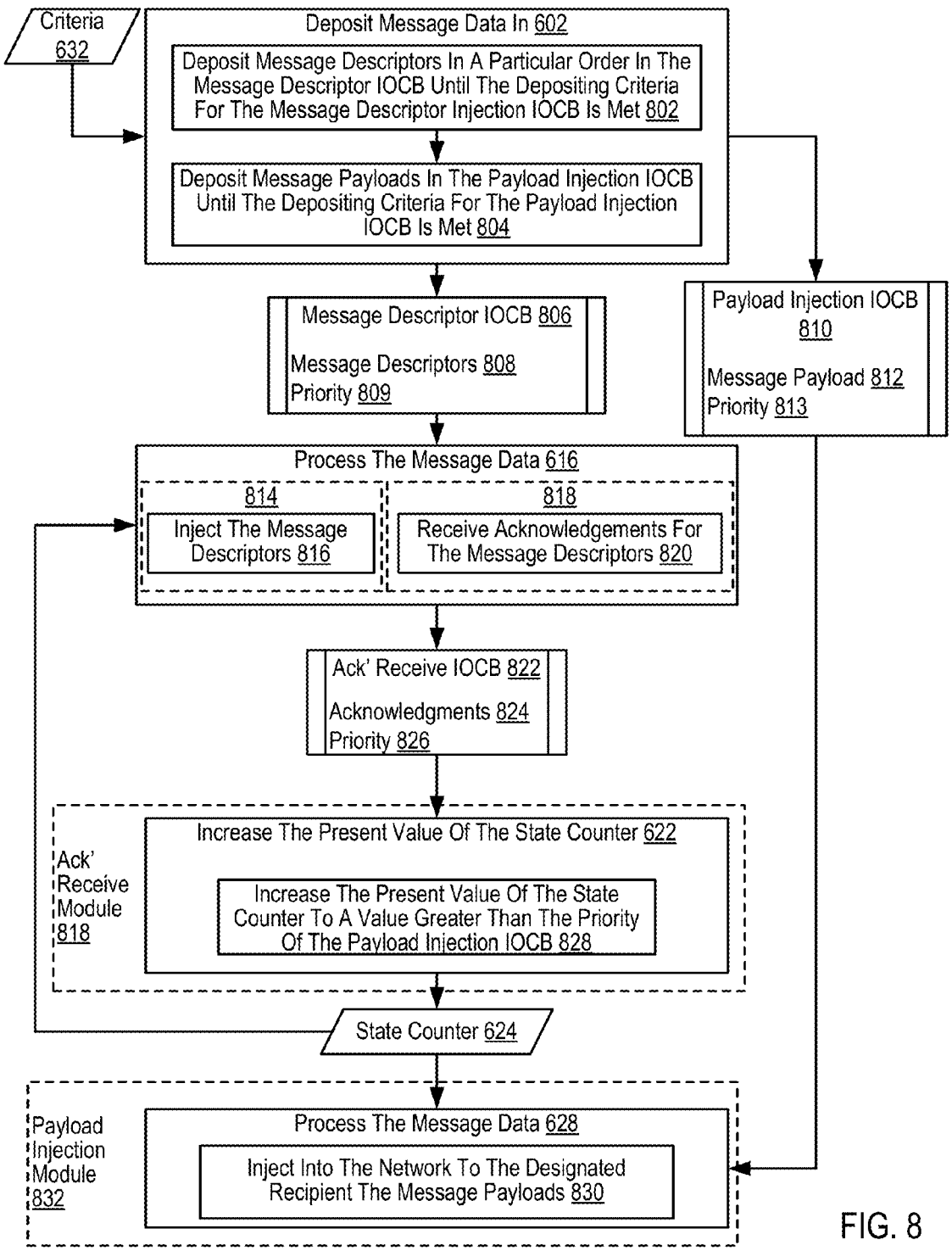
FIG. 8 sets forth a flow chart illustrating a further exemplary method for processing data communications messages with IOCBs according to embodiments of the present invention.

For further explanation, FIG. 8 sets forth a flow chart illustrating an exemplary method for processing data communications messages with IOCBs according to embodiments of the present invention. The method of FIG. 8 is similar to the method of FIG. 6 in that, in the method of FIG. 8, each IOCB is characterized by a priority (809, 813) and the IOCBs are arranged in sequential priority (809, 813) for serial operations. The method of FIG. 8 is also similar to the method of FIG. 6 in that the method of FIG. 8 includes depositing (602) message data (606, 612) in one or more IOCBs according to depositing criteria (632) for each IOCB; processing (616), by a message processing module associated with an IOCB having a priority less than the present value of a state counter (624), the message data in the IOCB while a message processing module associated with an IOCB having a next priority waits; increasing (622), upon completion of processing (616) the message data of the IOCB having a priority less than the present value of the state counter (624), the present value of the state counter (624) to a value greater than the next priority; and processing (628), by the message processing module associated with the IOCB having the next priority, the message data in the IOCB having the next priority.

The method of FIG. 8 differs from the method FIG. 6, however, in that in the method of FIG. 8, the IOCBs include a message descriptor injection IOCB (806), an acknowledgement receive IOCB (822), and a payload injection IOCB (810). The message descriptor injection IOCB (806) and the acknowledgment receive IOCB (822) have a priority (809, 826) less than the priority (813) of the payload injection IOCB (810). The priorities (809, 826) of the message descriptor injection IOCB (806) and the acknowledgment receive IOCB (822) may be equal or not, as long as both of the priorities (809,826) are less than the priority (813).

The method of FIG. 8 also differs from the method FIG. 6 in that, in the method of FIG. 8, depositing (602) message data (606, 612) in one or more IOCBs according to depositing criteria (632) for each IOCB is carried out by depositing (802) message descriptors (808) in a particular order in the message descriptor IOCB (806) until the depositing criteria (632) for the message descriptor injection IOCB (806) is met and depositing (804) message payloads (812) in the payload injection IOCB (810) until the depositing criteria (632) for the payload injection IOCB (810) is met.

Also in the method of FIG. 8, processing (616), by a message processing module associated with an IOCB having a priority less than the present value of a state counter (624), the message data in the IOCB while a message processing module associated with an IOCB having a next priority waits is carried out, while a payload injection module (832) associated with the payload injection IOCB (810) waits, by injecting (816), by a message descriptor injection module (814) associated with the message descriptor injection IOCB (806), in the particular order on an out-of-order data communications network to a designated recipient, the message descriptors (808) in the message descriptor injection IOCB (806) and receiving (820), by an acknowledgment receive module (818) associated with the acknowledgement receive IOCB (822), acknowledgements (824) for the message descriptors (808) sent to the designated recipient. In some out-of-order networks, a payload may not be sent to a target destination until the target destination returns an acknowledgment of receipt of a message descriptor.

Also in the method of FIG. 8, increasing (622), upon completion of processing (616) the message data of the IOCB having a priority less than the present value of the state counter (624), the present value of the state counter (624) to a value greater than the next priority is carried out by increasing (828), upon receipt of an acknowledgement (824) for all injected message descriptors (808) by the acknowledgment receive module (818) the present value of the state counter (624) to a value greater than the priority (813) of the payload injection IOCB (810).

Also in the method of FIG. 8, processing (628), by the message processing module associated with the IOCB having the next priority, the message data in the IOCB having the next priority is carried out by injecting (830), by the payload injection module (832), into the network to the designated recipient the message payloads (812). In this way, the method of FIG. 8 produces serial operations of sending a message descriptor of a message to a designated recipient, receiving from the designated recipient an acknowledgment of the message descriptor, and sending the payload of the message. When processing multiple messages, the method of FIG. 8 may include sending several message descriptors at a time, while collecting several acknowledgments at the same time. That is, the steps of injection message descriptors and receiving acknowledgements may occur in parallel. The step of payload injection, requires is dependent upon receiving an acknowledgement, and as such must be carried out serially with respect to message descriptor injection and receipt of acknowledgements.

Figure 9:
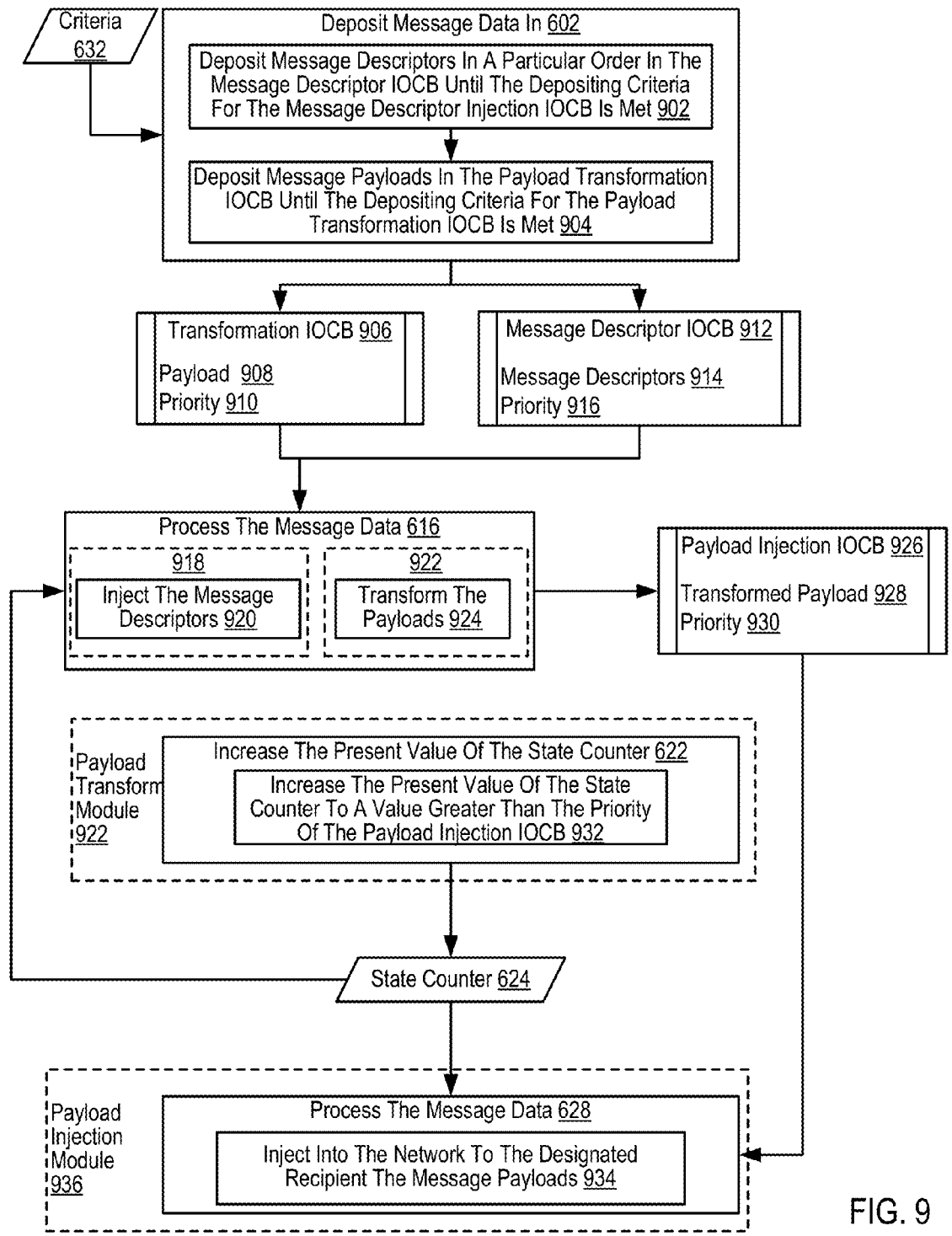
FIG. 9 sets forth a flow chart illustrating a further exemplary method for processing data communications messages with IOCBs according to embodiments of the present invention.

For further explanation, FIG. 9 sets forth a flow chart illustrating an exemplary method for processing data communications messages with IOCBs according to embodiments of the present invention. The method of FIG. 9 is similar to the method of FIG. 6 in that, in the method of FIG. 9, each IOCB is characterized by a priority (910, 916, 930) and the IOCBs are arranged in sequential priority (910, 916, 930) for serial operations. The method of FIG. 9 is also similar to the method of FIG. 6 in that the method of FIG. 9 includes depositing (602) message data (606, 612) in one or more IOCBs according to depositing criteria (632) for each IOCB; processing (616), by a message processing module associated with an IOCB having a priority less than the present value of a state counter (624), the message data in the IOCB while a message processing module associated with an IOCB having a next priority waits; increasing (622), upon completion of processing (616) the message data of the IOCB having a priority less than the present value of the state counter (624), the present value of the state counter (624) to a value greater than the next priority; and processing (628), by the message processing module associated with the IOCB having the next priority, the message data in the IOCB having the next priority.

The method of FIG. 9 differs from the method FIG. 6, however, in that in the method of FIG. 9, the IOCBs include a message descriptor IOCB (912), a payload transformation IOCB (906), and a payload injection IOCB (926). The message descriptor IOCB (912) and the payload transformation IOCB (906) have a priority (916, 910) that is less than the priority (930) of the payload injection IOCB (926).

The method of FIG. 9 differs from FIG. 6, however, in that in the method of FIG. 9, depositing (602) message data (606, 612) in one or more IOCBs according to depositing criteria (632) for each IOCB is carried out by depositing (902) message descriptors (912) in a particular order in the message descriptor IOCB (912) until the depositing criteria (632) for the message descriptor injection IOCB (912) is met and depositing (904) message payloads (908) in the payload transformation IOCB (906) until the depositing criteria (632) for the payload transformation IOCB (906) is met.

Also in the method of FIG. 9, processing (616), by a message processing module associated with an IOCB having a priority less than the present value of a state counter (624), the message data in the IOCB while a message processing module associated with an IOCB having a next priority waits is carried out, while a payload injection module (936) associated with the payload injection IOCB (926) waits, by injecting (920), by a message descriptor injection module (918) associated with the message descriptor injection IOCB (912), in the particular order on a data communications network to a designated recipient, the message descriptors (914) in the message descriptor injection IOCB (912) and transforming (924), by a payload transformation module (922) associated with the payload transformation IOCB (906), the message payloads (908). Transforming (924) the message payloads (908) may be carried out in various ways. Transforming message payloads may include reversing endianness of the payload, performing a mathematical operation to the payload, adding data, removing data, filtering data and so on as will occur to readers of skill in the art.

Also in the method of FIG. 9, increasing (622), upon completion of processing (616) the message data of the IOCB having a priority less than the present value of the state counter (624), the present value of the state counter (624) to a value greater than the next priority is carried out by increasing (932), upon transformation of all message payloads (908) in the payload transformation IOCB (906) by the payload transformation module (922), the present value of the state counter (624) to a value greater than the priority (930) of the payload injection IOCB (926).

Also in the method of FIG. 9, processing (628), by the message processing module associated with the IOCB having the next priority, the message data in the IOCB having the next priority is carried out by injecting (934), by the payload injection module (936), into the network to the designated recipient the transformed message payloads (928).

Figure 10:
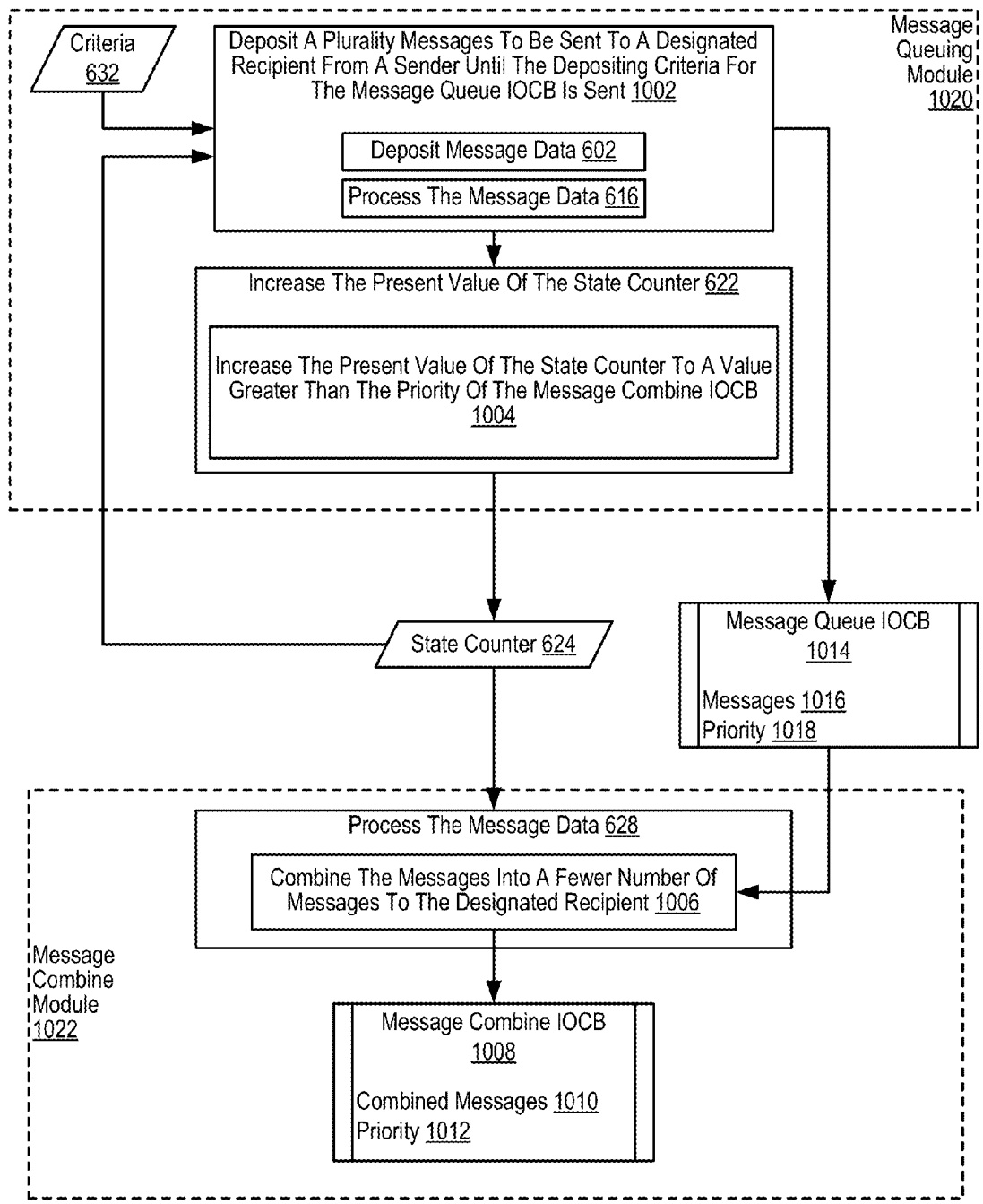
FIG. 10 sets forth a flow chart illustrating a further exemplary method for processing data communications messages with IOCBs according to embodiments of the present invention.

For further explanation, FIG. 10 sets forth a flow chart illustrating an exemplary method for processing data communications messages with IOCBs according to embodiments of the present invention. The method of FIG. 10 is similar to the method of FIG. 6 in that, in the method of FIG. 10, each IOCB is characterized by a priority (1018, 1012) and the IOCBs are arranged in sequential priority (1018, 1012) for serial operations. The method of FIG. 10 is also similar to the method of FIG. 6 in that the method of FIG. 10 includes depositing (602) message data (606, 612) in one or more IOCBs according to depositing criteria (632) for each IOCB; processing (616), by a message processing module associated with an IOCB having a priority less than the present value of a state counter (624), the message data in the IOCB while a message processing module associated with an IOCB having a next priority waits; increasing (622), upon completion of processing (616) the message data of the IOCB having a priority less than the present value of the state counter (624), the present value of the state counter (624) to a value greater than the next priority; and processing (628), by the message processing module associated with the IOCB having the next priority, the message data in the IOCB having the next priority.

The method of FIG. 10 differs from the method of FIG. 6, however, in that in the method of FIG. 10, the IOCBs include a messages queue IOCB (1014) and a message combine IOCB (1008). The messages queue IOCB (1014) has a priority (1018) less than the priority (1012) of the message combine IOCB (1008).

The method of FIG. 10 also differs from the method of FIG. 6 in that, in the method of FIG. 10, depositing (602) message data in one or more IOCBs according to depositing criteria for each IOCB and processing (616), by a message processing module associated with an IOCB having a priority less than the present value of the state counter, the message data in the IOCB while a message processing module associated with an IOCB having a next priority waits is carried out, while a message combining module (1022) associated with the message combine IOCB (1008) waits, by depositing (1002), by a message queuing module (1020) in the message queue IOCB (1014), a plurality of messages (1016) to be sent to a designated recipient from a sender until the depositing criteria (632) for the message queue IOCB (1014) is sent. Depositing (1002) a plurality of messages (1016) may be carried out by storing in the IOCB message descriptors of the messages, pointers to such message descriptors, pointers to the messages, and so on as will occur to a person of skill in the art.

In the method of FIG. 10, increasing (622), upon completion of processing the message data of the IOCB having a priority less than the present value of the state counter, the present value of the state counter to a value greater than the next priority is carried out by increasing (1004) the present value of the state counter (624) to a value greater than the priority (1012) of the message combine IOCB (1008).

In the method of FIG. 10, processing (628), by the message processing module associated with the IOCB having the next priority, the message data in the IOCB having the next priority includes combining (1006), by the message combine module (1022), the plurality of messages (1016) in the message queue IOCB, into a fewer number of messages (1010) to the designated recipient. Combining messages may include, combining messages into a predefined number of messages, into messages of a predefined size, and so on as will occur to readers of skill in the art. The method of FIG. 10 depicts only two IOCBs for clarity not limitation, Readers of skill in the art will immediately recognize that any number of message queue IOCBs and message descriptor IOCBs may be used to implement a serial combining operation for messages. Moreover, once the messages are combined the method of FIG. 10 may be used with the IOCBs and the methods of FIG. 7 or FIG. 8 to inject the message descriptors and payloads into the network.

Figure 11:
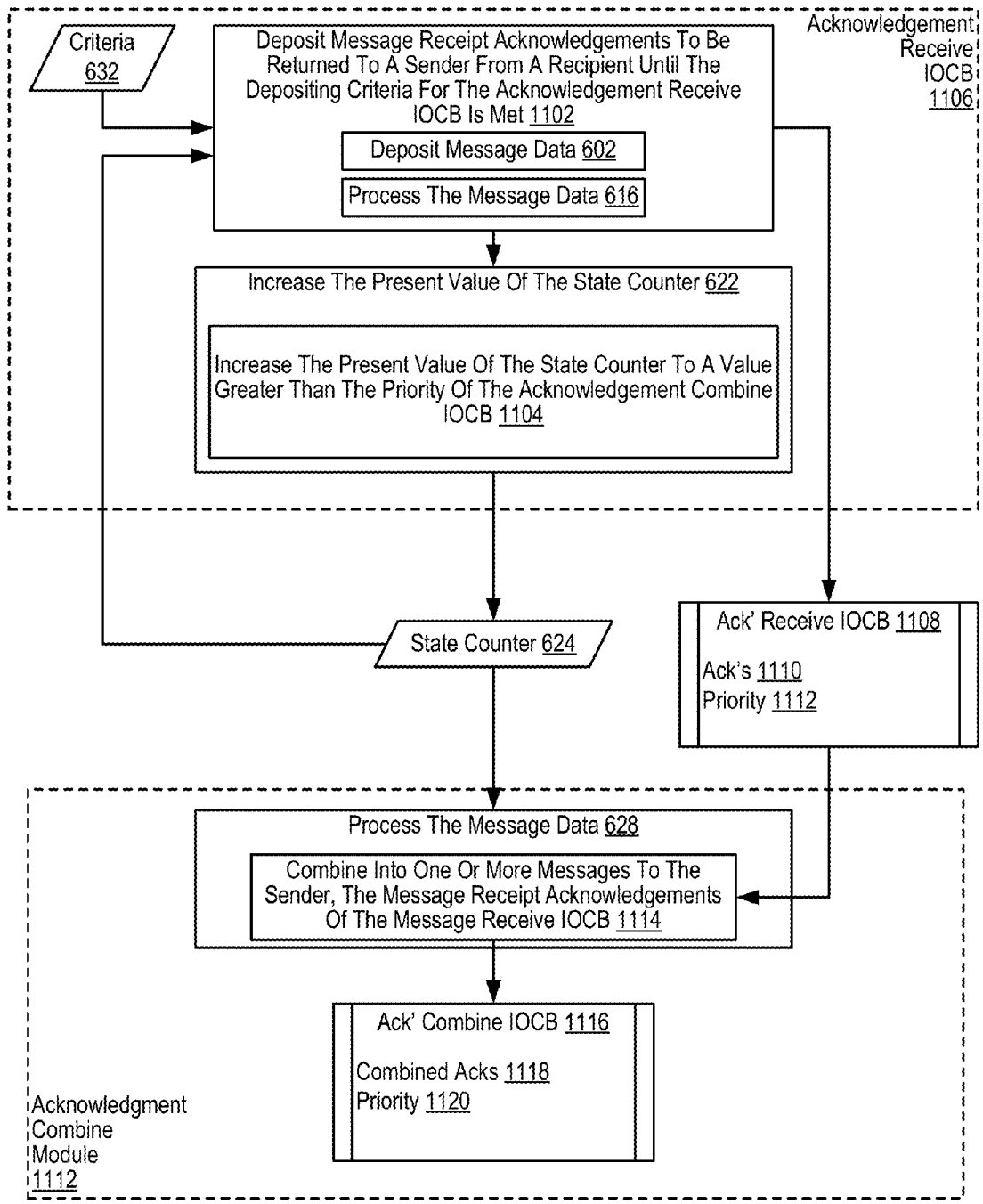
FIG. 11 sets forth a flow chart illustrating a further exemplary method for processing data communications messages with IOCBs according to embodiments of the present invention.

For further explanation, FIG. 11 sets forth a flow chart illustrating an exemplary method for processing data communications messages with IOCBs according to embodiments of the present invention. The method of FIG. 11 is similar to the method of FIG. 6 in that, in the method of FIG. 11, each IOCB is characterized by a priority (1112, 1120) and the IOCBs are arranged in sequential priority (1112, 1120) for serial operations. The method of FIG. 11 is also similar to the method of FIG. 6 in that the method of FIG. 11 includes depositing (602) message data (606, 612) in one or more IOCBs according to depositing criteria (632) for each IOCB; processing (616), by a message processing module associated with an IOCB having a priority less than the present value of a state counter (624), the message data in the IOCB while a message processing module associated with an IOCB having a next priority waits; increasing (622), upon completion of processing (616) the message data of the IOCB having a priority less than the present value of the state counter (624), the present value of the state counter (624) to a value greater than the next priority; and processing (628), by the message processing module associated with the IOCB having the next priority, the message data in the IOCB having the next priority.

The method of FIG. 11 differs from the method of FIG. 6, however, in that in the method of FIG. 11, the IOCBs include an acknowledgement receive IOCB (1108) and an acknowledgement combine IOCB (1116). The acknowledgement receive IOCB (1108) has a priority (1112) less than the priority (1120) of the acknowledgement combine IOCB (1116).

The method of FIG. 11 also differs from the method of FIG. 6 in that, in the method of FIG. 11, depositing (602) message data in one or more IOCBs according to depositing criteria for each IOCB and processing (616), by a message processing module associated with an IOCB having a priority less than the present value of the state counter, the message data in the IOCB while a message processing module associated with an IOCB having a next priority waits is carried out, while an acknowledgement combine module (1112) associated with the acknowledgment combine IOCB (1116) waits, by depositing (1102), by an acknowledgment receive module (1106), message receipt acknowledgements (1110) to be returned to a sender from a recipient until the depositing criteria (632) for the acknowledgement receive IOCB (1108) is met.

In the method of FIG. 11, increasing (622), upon completion of processing the message data of the IOCB having a priority less than the present value of the state counter, the present value of the state counter to a value greater than the next priority is carried out by increasing (1104) the present value of the state counter (624) to a value greater than the priority (1120) of the acknowledgement combine IOCB (1116).

In the method of FIG. 11, processing (628), by the message processing module associated with the IOCB having the next priority, the message data in the IOCB having the next priority is carried out by combining (1114), by the acknowledgement combine module (1112), into one or more messages (1118) to the sender, the message receipt acknowledgements (1110) of the acknowledgement receive IOCB (1108). In this way, the number of acknowledgements returned to a sender is decreased and data congestion in a network may be reduced.

In each of the FIG. 6-11 a relatively small number, two or three, of IOCBs are depicted for clarity of explanation. Readers of skill in the art will immediately recognize that processing data communications messages with IOCBs in accordance with embodiments of the present invention may include any number and types of IOCBs. Moreover, IOCB rings serving one purpose may be used in conjunction with other IOCBs serving other purposes. For example, two IOCB rings, serving different purposes may be used in conjunction with one another to process data communications messages. Each such implementation of IOCB rings used to process data communications messages is well within the scope present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for processing data communications messages in a parallel computer with a plurality of Input/Output Control Blocks ('IOCBs'), each IOCB characterized by a priority, the IOCBs arranged in sequential priority for serial operation, the apparatus comprising a computer processor and a computer memory operatively coupled to the computer processor, the computer memory having disposed within it computer program instructions capable of:
  depositing message data in one or more IOCBs according to depositing criteria for each IOCB;
  processing, by a message processing module associated with an IOCB having a priority less than a present value of a state counter, the message data in the IOCB having a priority less than the present value of the state counter while a message processing module associated with an IOCB having a next priority waits;
  increasing, upon completion of processing the message data of the IOCB having a priority less than the present value of the state counter, the present value of the state counter to a value greater than the next priority;
  processing, by the message processing module associated with the IOCB having the next priority, the message data in the IOCB having the next priority;
  wherein the IOCBs comprise a message descriptor injection IOCB and a payload injection IOCB, the message descriptor injection IOCB having a priority less than the priority of the payload injection IOCB;
  wherein depositing message data in one or more IOCBs according to depositing criteria for each IOCB further comprises:
    depositing message descriptors in a particular order in the message descriptor IOCB until the depositing criteria for the message descriptor injection IOCB is met; and
    depositing message payloads in the payload injection IOCB until the depositing criteria for the payload injection IOCB is met;
  wherein processing the message data in the IOCB having a priority less than the present value of the state counter further comprises:
    injecting, by a message descriptor injection module, the message descriptors on a network to a designated recipient in the particular order when the priority of the IOCB is less than the present value of the state counter while a payload injection module associated with the payload injection IOCB waits;
  increasing the present value of the state counter to a value greater than the next priority further comprises increasing by the message descriptor injection module the present value of the state counter to a value greater than the priority of the payload injection IOCB; and
  processing the message data in the IOCB having the next priority further comprises injecting, by the payload injection module, into the network to the designated recipient the message payloads.

2. The apparatus of claim 1 further comprising computer program instructions capable of:
  processing, in parallel, the message data in the IOCBs; and
  halting the processing of the message data in an IOCB having the next priority upon identification of a dependency on the processing of an IOCB having a priority less than the present value of the state counter.

3. The apparatus of claim 1, wherein:
  the IOCBs comprise a message descriptor injection IOCB, an acknowledgement receive IOCB, and a payload injection IOCB, the message descriptor injection IOCB and the acknowledgment receive IOCB having a priority less than the priority of the payload injection IOCB;
  depositing message data further comprises:
    depositing message descriptors in a particular order in the message descriptor IOCB until the depositing criteria for the message descriptor injection IOCB is met; and
    depositing message payloads in the payload injection IOCB until the depositing criteria for the payload injection IOCB is met; and
  processing the message data in the IOCB having a priority less than the present value of the state counter further comprises:

while a payload injection module associated with the payload injection IOCB waits: injecting, by a message descriptor injection module associated with the message descriptor injection IOCB, in the particular order on an out-of-order data communications network to a designated recipient, the message descriptors in the message descriptor injection IOCB and receiving, by an acknowledgment receive module associated with the acknowledgement receive IOCB, acknowledgements for the message descriptors sent to the designated recipient;

increasing the present value of the state counter to a value greater than the next priority further comprises increasing, upon receipt of an acknowledgement for all injected message descriptors by the acknowledgment receive module the present value of the state counter to a value greater than the priority of the payload injection IOCB; and processing the message data in the IOCB having the next priority further comprises injecting, by the payload injection module, into the network to the designated recipient the message payloads.

4. The apparatus of claim 1 wherein:

the IOCBs comprise a message descriptor IOCB, a payload transformation IOCB, and a payload injection IOCB, the message descriptor IOCB and the payload transformation IOCB having a priority that is less than the priority of the payload injection IOCB;

depositing message data further comprises:
  depositing message descriptors in a particular order in the message descriptor IOCB until the depositing criteria for the message descriptor injection IOCB is met; and
  depositing message payloads in the payload transformation IOCB until the depositing criteria for the payload transformation IOCB is met; and processing, by a message processing module associated with an IOCB having a priority less than the present value of the state counter, the message data in the IOCB while a message processing module associated with an IOCB having a next priority waits further comprises:
  while a payload injection module associated with the payload injection IOCB waits: injecting, by a message descriptor injection module associated with the message descriptor injection IOCB, in the particular order on a data communications network to a designated recipient, the message descriptors in the message descriptor injection IOCB and transforming, by a payload transformation module associated with the payload transformation IOCB, the message payloads;

increasing the present value of the state counter to a value greater than the next priority further comprises increasing, upon transformation of all message payloads in the payload transformation IOCB by the payload transformation module, the present value of the state counter to a value greater than the priority of the payload injection IOCB; and processing the message data in the IOCB having the next priority further comprises injecting, by the payload injection module, into the network to the designated recipient the transformed message payloads.

5. The apparatus of claim 1, wherein:

the IOCBs comprise a messages queue IOCB and a message combine IOCB, the messages queue IOCB having a priority less than the priority of the message combine IOCB;

depositing message data and processing, the message data in the IOCB having a priority less than the present value of the state counter further comprises:
  while a message combining module associated with the message combine IOCB waits, depositing, by a message queuing module in the message queue IOCB, a plurality of messages to be sent to a designated recipient from a sender until the depositing criteria for the message queue IOCB is sent;

increasing the present value of the state counter to a value greater than the next priority further comprises increasing the present value of the state counter to a value greater than the priority of the message combine IOCB; and processing the message data in the IOCB having the next priority further comprises combining, by the message combine module, the plurality of messages in the message queue IOCB, into a fewer number of messages to the designated recipient.

6. The apparatus of claim 1, wherein:

the IOCBs comprise an acknowledgement receive IOCB and an acknowledgement combine IOCB, the acknowledgement receive IOCB having a priority less than the priority of the acknowledgement combine IOCB;

depositing message data and processing the message data in the IOCB having a priority less than the present value of the state counter further comprises:
  while an acknowledgement combine module associated with the acknowledgment combine IOCB waits, depositing, by an acknowledgment receive module, message receipt acknowledgements to be returned to a sender from a recipient until the depositing criteria for the acknowledgement receive IOCB is met; and increasing the present value of the state counter to a value greater than the next priority further comprises increasing the present value of the state counter to a value greater than the priority of the acknowledgement combine IOCB; and processing the message data in the IOCB having the next priority further comprises combining, by the acknowledgement combine module, into one or more messages to the sender, the message receipt acknowledgements of the acknowledgement receive IOCB.

7. The apparatus of claim 1, wherein the IOCBs are arranged as an IOCB ring, each IOCB including, as a final memory address in the IOCB, a pointer to a next IOCB of the IOCB ring, a final IOCB of the IOCB ring including a pointer to a first IOCB in the IOCB ring.

8. A computer program product for processing data communications messages in a parallel computer with a plurality of Input/Output Control Blocks ('IOCBs'), each IOCB characterized by a priority, the IOCBs arranged in sequential priority for serial operation, the computer program product disposed in a computer readable storage medium, wherein the computer readable storage medium is not a signal, the computer program product comprising computer program instructions capable of:

depositing message data in one or more IOCBs according to depositing criteria for each IOCB;

processing, by a message processing module associated with an IOCB having a priority less than a present value of a state counter, the message data in the IOCB having a priority less than the present value of the state counter while a message processing module associated with an IOCB having a next priority waits;

increasing, upon completion of processing the message data of the IOCB having a priority less than the present value of the state counter, the present value of the state counter to a value greater than the next priority;

processing, by the message processing module associated with the IOCB having the next priority, the message data in the IOCB having the next priority;

wherein the IOCBs comprise a message descriptor injection IOCB and a payload injection IOCB, the message descriptor injection IOCB having a priority less than the priority of the payload injection IOCB;

wherein depositing message data in one or more IOCBs according to depositing criteria for each IOCB further comprises:

depositing message descriptors in a particular order in the message descriptor IOCB until the depositing criteria for the message descriptor injection IOCB is met; and depositing message payloads in the payload injection IOCB until the depositing criteria for the payload injection IOCB is met;

wherein processing the message data in the IOCB having a priority less than the present value of the state counter further comprises:

injecting, by a message descriptor injection module, the message descriptors on a network to a designated recipient in the particular order when the priority of the IOCB is less than the present value of the state counter while a payload injection module associated with the payload injection IOCB waits;

increasing the present value of the state counter to a value greater than the next priority further comprises increasing by the message descriptor injection module the present value of the state counter to a value greater than the priority of the payload injection IOCB; and processing the message data in the IOCB having the next priority further comprises injecting, by the payload injection module, into the network to the designated recipient the message payloads.

9. The computer program product of claim 8 further comprising computer program instructions capable of:

processing, in parallel, the message data in the IOCBs; and halting the processing of the message data in an IOCB having the next priority upon identification of a dependency on the processing of an IOCB having a priority less than the present value of the state counter.

10. The computer program product of claim 8, wherein:

the IOCBs comprise a message descriptor injection IOCB, an acknowledgement receive IOCB, and a payload injection IOCB, the message descriptor injection IOCB and the acknowledgment receive IOCB having a priority less than the priority of the payload injection IOCB;

depositing message data further comprises:

depositing message descriptors in a particular order in the message descriptor IOCB until the depositing criteria for the message descriptor injection IOCB is met; and depositing message payloads in the payload injection IOCB until the depositing criteria for the payload injection IOCB is met; and processing the message data in the IOCB having a priority less than the present value of the state counter further comprises:

while a payload injection module associated with the payload injection IOCB waits: injecting, by a message descriptor injection module associated with the message descriptor injection IOCB, in the particular order on an out-of-order data communications network to a designated recipient, the message descriptors in the message descriptor injection IOCB and receiving, by an acknowledgment receive module associated with the acknowledgement receive IOCB, acknowledgements for the message descriptors sent to the designated recipient;

increasing the present value of the state counter to a value greater than the next priority further comprises increasing, upon receipt of an acknowledgement for all injected message descriptors by the acknowledgment receive module the present value of the state counter to a value greater than the priority of the payload injection IOCB; and processing the message data in the IOCB having the next priority further comprises injecting, by the payload injection module, into the network to the designated recipient the message payloads.

11. The computer program product of claim 8 wherein:

the IOCBs comprise a message descriptor IOCB, a payload transformation IOCB, and a payload injection IOCB, the message descriptor IOCB and the payload transformation IOCB having a priority that is less than the priority of the payload injection IOCB;

depositing message data further comprises:

depositing message descriptors in a particular order in the message descriptor IOCB until the depositing criteria for the message descriptor injection IOCB is met; and depositing message payloads in the payload transformation IOCB until the depositing criteria for the payload transformation IOCB is met; and processing, by a message processing module associated with an IOCB having a priority less than the present value of the state counter, the message data in the IOCB while a message processing module associated with an IOCB having a next priority waits further comprises:

while a payload injection module associated with the payload injection IOCB waits: injecting, by a message descriptor injection module associated with the message descriptor injection IOCB, in the particular order on a data communications network to a designated recipient, the message descriptors in the message descriptor injection IOCB and transforming, by a payload transformation module associated with the payload transformation IOCB, the message payloads;

increasing the present value of the state counter to a value greater than the next priority further comprises increasing, upon transformation of all message payloads in the payload transformation IOCB by the payload transformation module, the present value of the state counter to a value greater than the priority of the payload injection IOCB; and processing the message data in the IOCB having the next priority further comprises injecting, by the payload injection module, into the network to the designated recipient the transformed message payloads.

12. The computer program product of claim 8, wherein:

the IOCBs comprise a messages queue IOCB and a message combine IOCB, the messages queue IOCB having a priority less than the priority of the message combine IOCB;

depositing message data and processing, the message data in the IOCB having a priority less than the present value of the state counter further comprises:

while a message combining module associated with the message combine IOCB waits, depositing, by a message queuing module in the message queue IOCB, a plurality of messages to be sent to a designated recipient from a sender until the depositing criteria for the message queue IOCB is sent;

increasing the present value of the state counter to a value greater than the next priority further comprises increasing the present value of the state counter to a value greater than the priority of the message combine IOCB; and processing the message data in the IOCB having the next priority further comprises combining, by the message combine module, the plurality of messages in the message queue IOCB, into a fewer number of messages to the designated recipient.

13. The computer program product of claim 8, wherein:

the IOCBs comprise an acknowledgement receive IOCB and an acknowledgement combine IOCB, the acknowledgement receive IOCB having a priority less than the priority of the acknowledgement combine IOCB;

depositing message data and processing the message data in the IOCB having a priority less than the present value of the state counter further comprises:

while an acknowledgement combine module associated with the acknowledgment combine IOCB waits, depositing, by an acknowledgment receive module, message receipt acknowledgements to be returned to a sender from a recipient until the depositing criteria for the acknowledgement receive IOCB is met; and increasing the present value of the state counter to a value greater than the next priority further comprises increasing the present value of the state counter to a value greater than the priority of the acknowledgement combine IOCB; and processing the message data in the IOCB having the next priority further comprises combining, by the acknowledgement combine module, into one or more messages to the sender, the message receipt acknowledgements of the acknowledgement receive IOCB.

14. The computer program product of claim 8, wherein the IOCBs are arranged as an IOCB ring, each IOCB including, as a final memory address in the IOCB, a pointer to a next IOCB of the IOCB ring, a final IOCB of the IOCB ring including a pointer to a first IOCB in the IOCB ring.

* * * * *